United States Patent [19]

Murray

[11] Patent Number: 4,737,820
[45] Date of Patent: Apr. 12, 1988

[54] DUPLEX FEEDER JAM RECOVERY

[75] Inventor: Thomas J. Murray, Rochester, N.Y.

[73] Assignee: Eastman Kodak Company, Rochester, N.Y.

[21] Appl. No.: 62,539

[22] Filed: Jun. 15, 1987

[51] Int. Cl.$^4$ ............................................. G03G 15/00
[52] U.S. Cl. .......................... 355/14 SH; 355/3 SH; 355/77; 271/3.1; 271/163
[58] Field of Search .................. 355/14 SH, 3 SH, 77, 355/24, 25, 26; 271/3.1, 163

[56] References Cited

U.S. PATENT DOCUMENTS

| | | | |
|---|---|---|---|
| T957,006 | 4/1977 | Reid et al. | 271/3.1 |
| 4,078,787 | 3/1978 | Burlew et al. | 271/3.1 |
| 4,169,674 | 10/1979 | Russel | 355/14 SH |
| 4,264,187 | 4/1981 | Rhodes, Jr. | 355/14 SH |
| 4,327,993 | 5/1982 | Gauronski et al. | 355/14 SH |
| 4,338,023 | 7/1982 | McGibbon | 355/14 SH |
| 4,456,236 | 6/1984 | Buddendeck | 355/14 SH X |
| 4,627,709 | 12/1986 | Kitajima et al. | 355/14 SH |

Primary Examiner—A. C. Prescott
Attorney, Agent, or Firm—Milton S. Sales

[57] ABSTRACT

A duplex recirculating document sheet feeder jam recovery procedure starts with removing the copy sheets from the document sheet path and facially orienting the removed sheets the same as the top sheet in the hopper. The removed and oriented sheets are returned to the top of the set in the hopper in the sequential order starting with the furthest downstream sheet along the document sheet path, and progressing sequentially toward the hopper exit. The document sheets are then fed seriatim from the bottom of the hopper, through the document sheet path, and back to the top of the hopper in their initial facial orientation if the last set of a job is in progress, and otherwise in the facial orientation opposite to their initial facial orientation. Again, the document sheets are fed seriatim from the bottom of the hopper, through the document sheet path, and back to the top of the hopper until as much of the document set as has already been copied in the current run has been returned to the hopper. Copying may then be resumed.

4 Claims, 9 Drawing Sheets

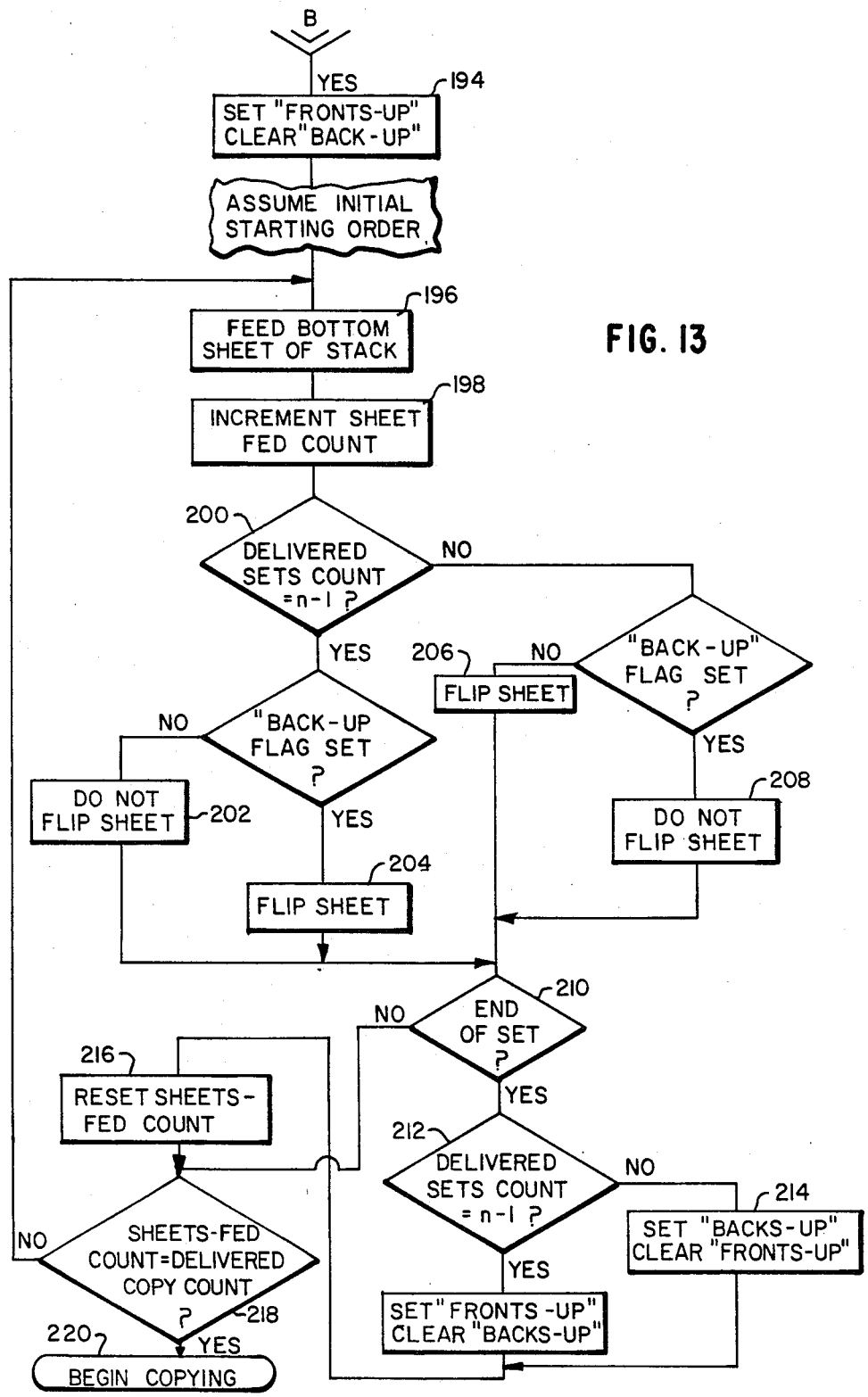

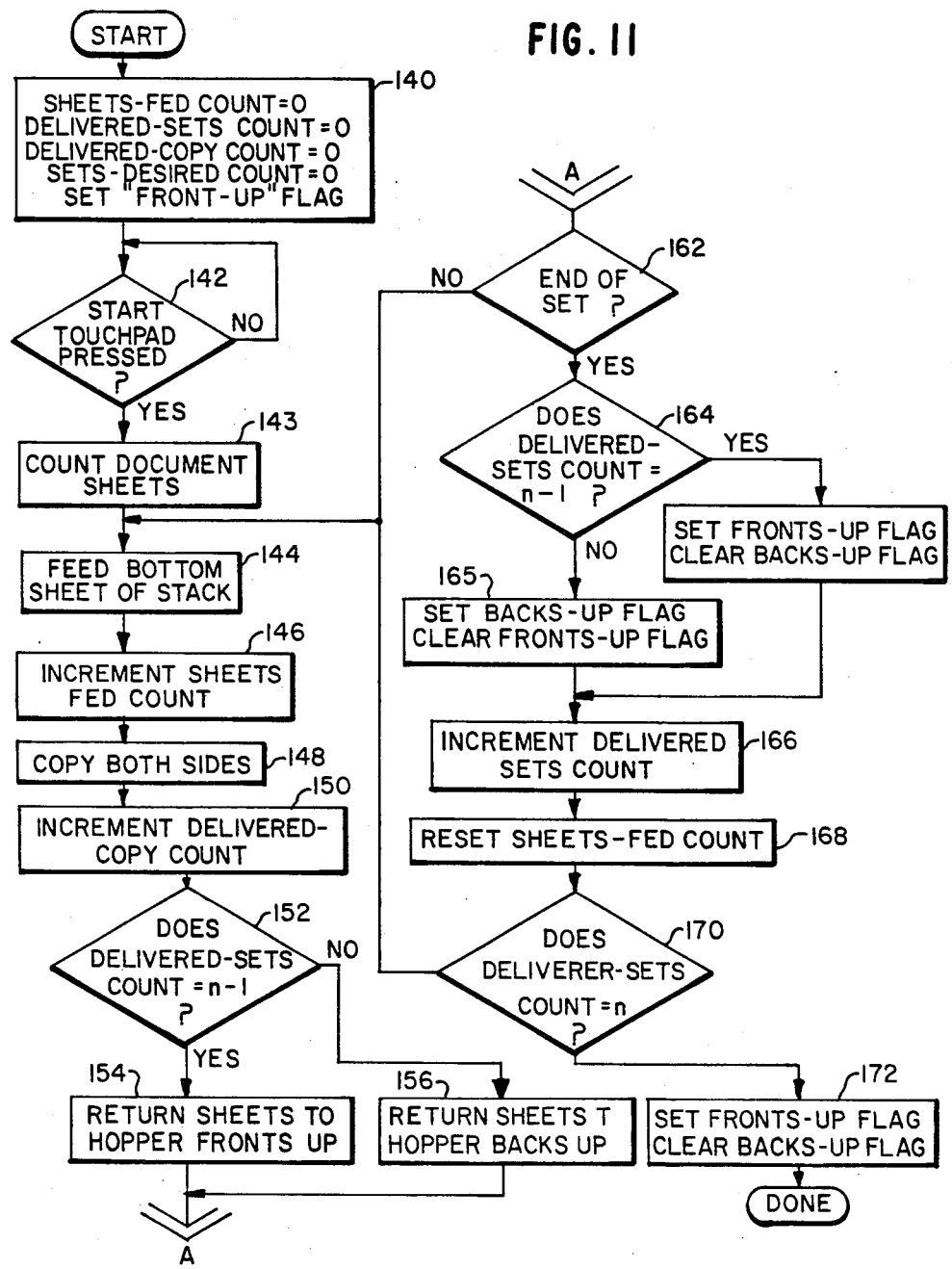

DUPLEX FEEDER JAM RECOVERY

BACKGROUND OF THE INVENTION

1. Field of the Invention

This invention relates generally to copiers having recirculating document sheet feeders capable of presenting sheets of simplex or duplex documents to an exposure platen in a manner which enables the copier to reproduce collated sets of copies; and more particularly to such copiers which are capable of automatically recovering from a feeder paper jam by rearranging document sheets in the feeder hopper once a jam has been cleared.

2. Description of the Prior Art

Jam recovery procedures maintain the integrity of the run in progress while feeder paper jams are cleared. The procedures allow the the copy run to restart at the position where the trouble was encountered.

There are various types of recovery procedures in the prior art. For example, commonly assigned U.S. Pat. No. 4,078,787, which issued on Mar. 14, 1978 to L. E. Burlew et al teaches a recovery technique for copiers having only simplex capabilities, wherein the operator removes all document sheets from the feeder, rearranges them to their initial order, and replaces them in the feeder hopper. The feeder then circulates the document sheets to the proper position; i.e., until the sheet corresponding to the one which was being brought to the exposure platen at the time of the jam is at the bottom of the stack; whereupon copying resumes. Alternatively, the operator could just remove the jammed document sheets, and place them on top of the stack; the feeder thereupon cycling the sheets to the proper position.

U.S. Pat. No. 4,327,993, which issued on May 4, 1982 to J. F. Gauronski et al, teaches a recovery procedure in copiers having double-pass duplexing capabilities. In double-pass duplexing, the even numbered (back) side of each document sheet is copied onto a set of copy sheets, which are then stored in a duplex buffer tray. The document sheets are inverted before they are returned to the stack so that their odd numbered (front) sides can be copied onto the stored copy sheets during the second pass. If a jam occurs in the recirculating document feeder, recovery is accomplished by means of the operator clearing the feeder's document sheet path and restacking the document sheets in the hopper in their original order. The feeder then circulates the sheets until the document sheet side corresponding to the one which was being brought to the exposure platen at the time of the jam is at the bottom of the stack.

Single-pass duplexing enables a copier to reproduce collated sets of duplex documents at maximum reproduction rates by circulating document sheets seriatim from the hopper, and, using a turn-over mechanism, copying both faces before returning the sheet to the feeder hopper. Such a system is employed in the Ektaprint 300 copier-duplicator manufactured by the Eastman Kodak Co., and is disclosed in commonly assigned U.S. patent application Ser. No. 862,854 filed on May 13, 1986 in the names of J. E. Smith et al. During each circulation of the document set except the last such circulation, after both sides of each sheet are exposed, each sheet is returned to the hopper with its facial orientation being reversed with respect to its initial facial orientation in the hopper. If a jam occurs in the recirculating document feeder, recovery is accomplished by the operator clearing the feeder's document sheet path and restacking those and the document sheets in the hopper in their original order and facial orientation.

Returning the document sheets to their original order and facial orientation is not an easy task. Each document sheet (including the entire stack) must be inspected and, if necessary, flipped manually so that its odd numbered, front side faces up. This is a time consuming operation when the set comprises many document sheets.

SUMMARY OF THE INVENTION

It is an object of the present invention to provide duplex recirculating document sheet feeders with a recovery procedure for maintaining the integrity of a run in progress upon the occurrence of a feeder jam such that the copy run can be restarted at the position where the trouble was encountered without the need for the operator to restack all the document sheets in either their original, or other, predetermined order and facial orientation.

In accordance with the present invention, the process starts with removing the copy sheets from the document sheet path and facially orienting the removed sheets the same as the top sheet in the hopper. The removed and oriented sheets are returned to the top of the set in the hopper in the sequential order starting with the furthest downstream sheet along the document sheet path, and progressing sequentially toward the hopper exit. The document sheets are then fed seriatim from the bottom of the hopper, through the document sheet path, and back to the top of the hopper in their initial facial orientation if the last set of a job is in progress, and otherwise in the facial orientation opposite to their initial facial orientation. Again, the document sheets are fed seriatim from the bottom of the hopper, through the document sheet path, and back to the top of the hopper until as much of the document set as has already been copied in the current run has been returned to the hopper. Copying may then be resumed.

The invention, and its objects and advantages, will become more apparent in the detailed description of the preferred embodiments presented below.

BRIEF DESCRIPTION OF THE DRAWINGS

In the detailed description of the preferred embodiments of the invention presented below, reference is made to the accompanying drawings, in which:

FIG. 11 is a flow chart showing the sequential operations of the document feeder of FIG. 2 during normal operation for transporting duplex document sheets;

FIG. 13 is a flow chart continuation of FIG. 12 showing operations during standard jam recovery operations.

DESCRIPTION OF THE PREFERRED EMBODIMENT

Figure 1:
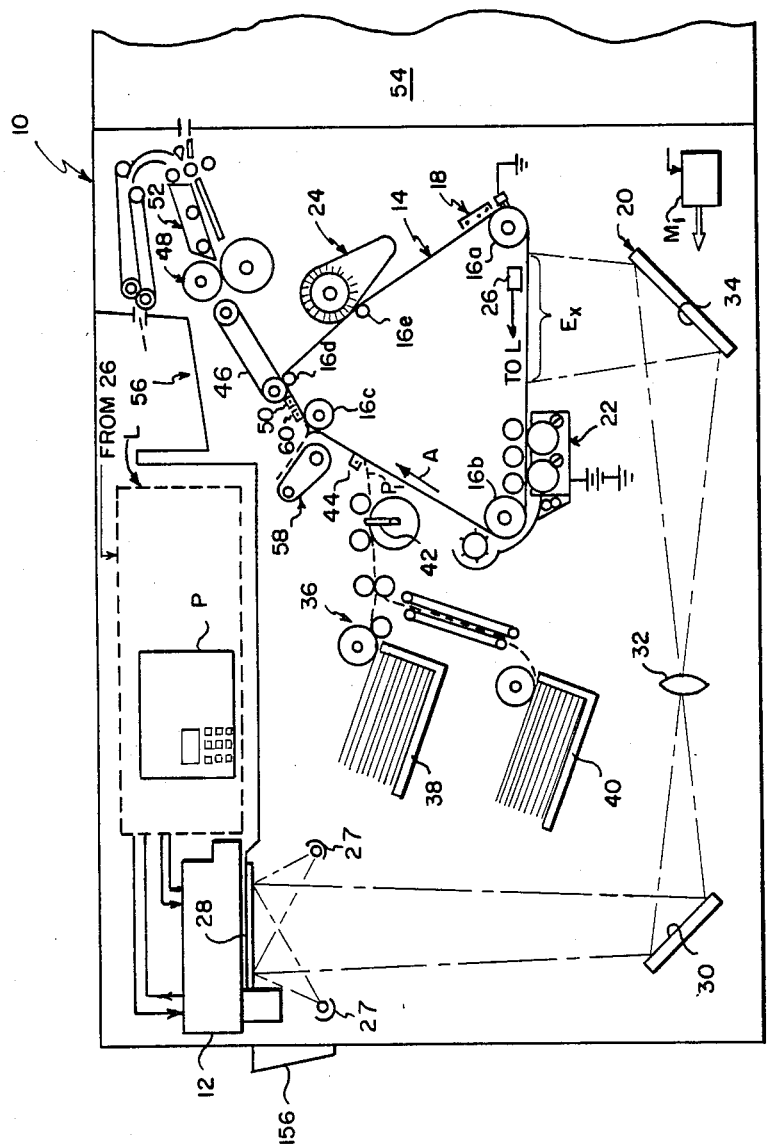
FIG. 1 is a schematic illustration of a copier apparatus incorporating the present invention.

Referring now to the accompanying drawings, FIG. 1 shows an exemplary reproduction apparatus (copier), designated generally by the numeral 10, with which a document feeder 12 is associated. Apparatus 10 is herein described only to the extent necessary for a full understanding of this invention. For a more complete description of the exemplary reproduction apparatus, see for example U.S. Pat. No. 4,174,905 issued Nov. 20, 1979, in the name of Difrancesco et al. Of course, other reproduction apparatus are suitable for use with this invention.

DESCRIPTION OF THE REPRODUCTION APPARATUS

Reproduction apparatus 10 includes an endless photoconductive belt 14 transported about a closed loop path in the direction of arrow A, in operative relation to electrographic process stations including a charging apparatus 18, an exposure mechanism 20, a developer apparatus 22, and a cleaning mechanism 24.

A logic and control unit (LCU) includes, for example, a microprocessor receiving input signals from an operator control panel P and a timing signal generator (not shown) detecting the movement of the belt 14 about its closed loop path. Based on such signals and a program from the microprocessor, the LCU produces signals to control the transport of belt 14 and the operation of the various electrographic process stations for carrying out the reproduction process.

The production of a program for a number of commercially available microprocessors such as INTEL Model 8080 or Model 8085 microprocessor (which along with others are suitable for use with the invention), is a conventional skill well understood in the art. The particular details of any such program would, of course, depend on the architecture of the designated microprocessor.

In the operation of reproduction apparatus 10, belt 14 moves past charging apparatus 18 which deposits a uniform electrostatic charge on a portion of the belt. After being charged, such portion moves through an exposure zone $E_x$ relative to exposure mechanism 20. The exposure mechanism 20 includes lamps 26 which illuminate the information-containing face of a document located in juxtaposition with a transparent platen 28 by feeder 12 in the manner to be explained hereinbelow. A reflected light image of such document information is projected along an optical path via a mirror 30, a lens 32, and a mirror 34 onto the portion of belt 14 in exposure zone $E^x$. Accordingly, the reflected light image of the document exposes belt 14 and alters the uniform charge thereon to form a charge pattern corresponding to such image.

The portion of belt 14 bearing such pattern is moved into operative relation with developer apparatus 22 which brings pigmented marking particles into contact with the belt to develop the pattern into a transferable image.

A receiver sheet transport mechanism, designated generally by the numeral 36, advances a receiver sheet from a first supply 38 or second supply 40 along the path $P_1$ into contact with the belt 14.

The image on belt 14 is transferred from the belt to the receiver sheet by an electrostatic field produced, for example, by a charger 44 The receiver sheet advances with belt 14 to a transport mechanism which strips the sheet from the belt and transports the sheet to a fusing mechanism 48 where the transferred image is fixed to the sheet by heat and/or pressure for example. Stripping of the receiver sheet from the belt 14 is aided by a detack charger 50. After the image is fixed to the receiver sheet, the sheet is transported by mechanism 52 to an output device 54, such as a finisher or binder for example, or to a hopper 56 for operator retrieval. Substantially simultaneously, the portion of the belt 14 previously bearing the transferable image moves past cleaning mechanism 24.

The particular exemplary reproduction apparatus 10 of FIG. 1 is capable of making duplex reproductions in a single pass of a receiver sheet through the apparatus. To make a duplex reproduction, two transferable images for respective transfer to opposite faces of the receiver sheet are sequentially produced on belt 14 in adjacent areas (in the direction of belt travel). The first image is transferred to one face of the receiver sheet by charger 44 in the manner described above. The receiver sheet is thereafter stripped from belt 14 by a transport mechanism 58. The mechanism removes the sheet entirely from the belt 14 and then returns the sheet to the belt along the same path in a turned over condition in register with the second image on the belt. The second image is then transferred to the opposite face of the receiver sheet by an electrostatic field produced by a charger 60. The receiver sheet bearing the transferred images on both faces is thereafter transported through fusing mechanism 48 in the manner described above where the images are fixed thereto and delivered to output device 54 or hopper 56.

The Document Feeder

Figure 2:
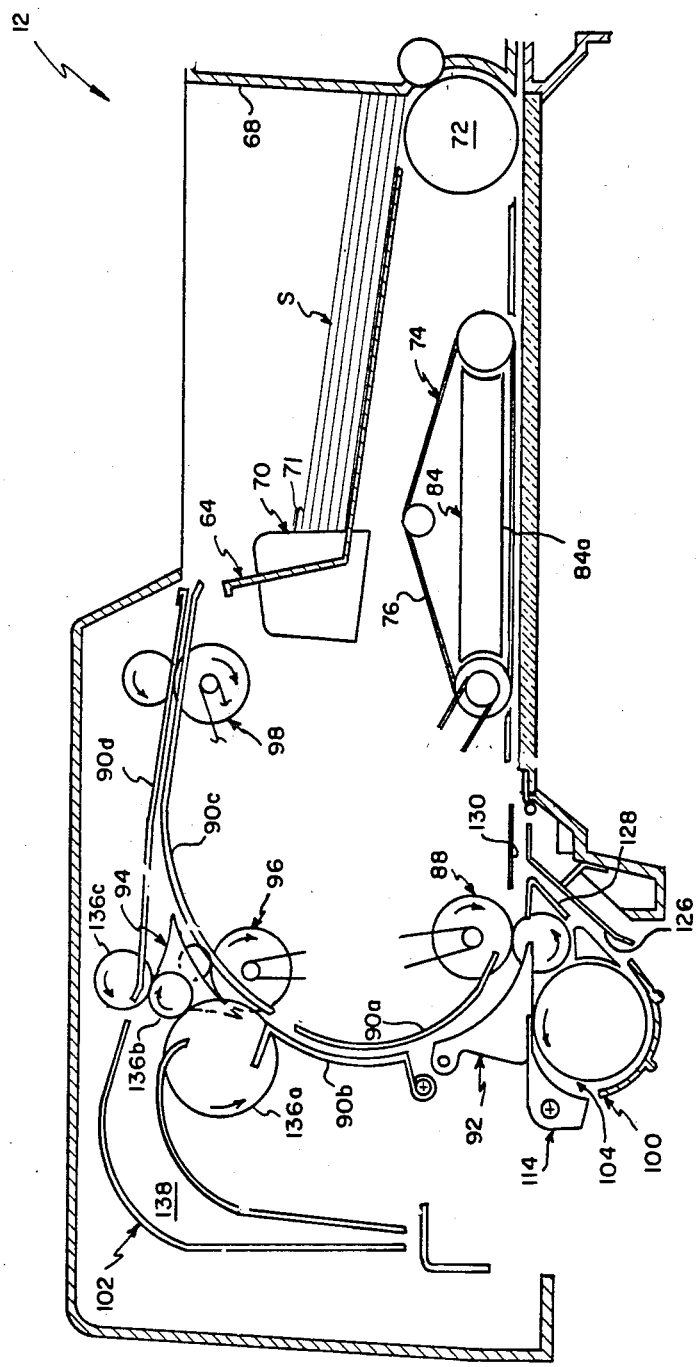
FIG. 2 is a side elevational view of a portion of the apparatus of FIG. 1, showing details of a document feeder partially in cross-section and with portions broken away or removed to facilitate viewing.

Document feeder 12 is constructed to present simplex or duplex document sheets in juxaposition with transparent platen 28 of reproduction apparatus 10 so that simplex or duplex reproductions may be made thereby. As shown in FIG. 2, the feeder 12 includes a hopper 64 for supporting a set of document sheets S. A jogger and set-completed detector 70 (more fully described in U.S. Pat. No. 4,169,674, issued Oct. 2, 1979, in the name of Russel) are located in the hopper. A set separator or finger 71 separates document sheets in a set to be copied from those sheets that have already been copied and returned to hopper 64.

A sheet feeding device, such as an oscillating vacuum feeder 72 for example, selectively vacuum tacks the bottom-most sheet in the set S to the peripheral surface thereof and removes such sheet from the set by rotating in a clockwise direction to advance such sheet to a transport mechanism 74. Mechanism 74 includes a reversibly driven belt 76. Initially belt 76 rotates in a clockwise direction about its closed loop path. A vacuum plenum 84 has a ported bottom plate 84a whereby vacuum from the plenum is effective through the ported plate and the ported belt 76 to tack a sheet to the belt for movement therewith relative to the platen 28 (i.e. from right to left in FIG. 2).

Figure 3:
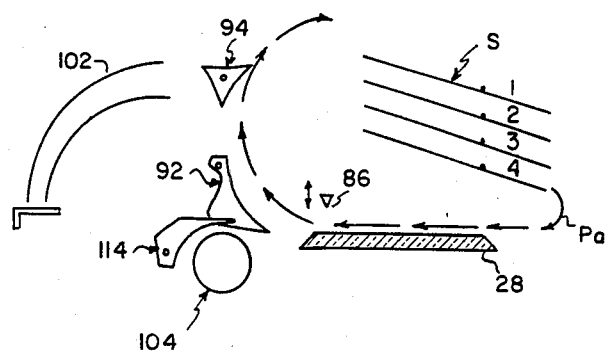
FIG. 3 is a diagramatic illustration of the operation of the document feeder of FIG. 2 for transporting simplex document sheets.

During exposure, a document sheet is stopped over the platen 28. After exposure, mechanism 74 advances the sheet under to a set of nip rollers 88, driven in the indicated direction. When reproduction of information contained on only one face of the respective document sheets (e.g., simplex document sheets) in set S is desired, nip rollers 88 advance the sheet from the platen into a path described by guides 90a–90d and diverters 92 and 94 (located in their respective positions shown in FIG. 2). Additional nip roller sets 96 and 98 advances the sheet along such path to return the sheet to hopper 64. On return to the hopper, the document sheet is received on the top of the set in the same facial orientation as its initial facial orientation in the set. As particularly shown in FIG. 3, the document sheet set S is initially placed in the hopper with the respective information-containing faces of each sheet being oriented face up. Ideally the set is in page sequential order with the first page on top. In this manner, the document sheets are advanced seriatim from the hopper, last page first, advanced along path $P_a$ with their respective information-containing faces directed toward the platen 28, exposed at the platen, and returned to the hopper in their initial facial orientation. Reproductions of the set would then be made at the full reproduction rate of the apparatus 10. The reproductions would be stacked in output device 54 or hopper 56, collated in the same page sequential order.

In order to maximize the use of the full reproduction rate of the apparatus 10 in making reproductions of information contained on both faces of the respective document sheets in set S (e.g. duplex document sheets), turn-over devices 100 and 102 are provided. The turn-over device 100 (best shown in FIG. 2) includes a roller 104. A document sheet is directed from the nip roller set 88 toward the turn-over device 100 by pivoting diverter 92 to its position of FIG. 4 from its position of FIG. 3. A diverter 114 is utilized to direct the document sheet into contact with roller 104 of the turn-over device 100. The rotation of roller 104 advances the document sheet toward a travel path defined by guides 126, 128, and 130, and the sheet is thereby directed toward platen 28 in a turned over condition (i.e. the face previously directed toward the platen is now directed away from the platen), where it again comes under the control of the transport mechanism 74. Belt 76 is driven in a counter-clockwise direction to transport the document sheet from left to right in FIG. 2 over platen 28. The document sheet is stopped on platen 28 for exposure.

Turn-over device 102 comprises a three-roller cluster 136 (see FIG. 2). The middle roller 136b of the cluster is coaxially located on the pivot axis of the diverter 94. Turn-over device 102 also includes a sheet receiving chamber 138 to turn over a document sheet, diverter 94 is moved from its FIG. 2 position to a position (FIG. 6) where it intercepts the document sheet travel path. The document sheet is directed by diverter 94 into the nip between rollers 136a and 136b and advanced into chamber 138. Reversing its direction of travel, the lead edge of the sheet becomes the trail edge. The new lead edge of the moving document sheet is directed to enter the nip between rollers 136b and 136c to advance the sheet over diverter 94. The document sheet is thus returned to the travel path defined by guides 90c and 90d in a turn-over condition for delivery to hopper 64 with the facial orientation thereof being opposite to its initial facial orientation.

The steps in the operation of document feeder 12 and associated turn-over devices 100 and 102 for making reproductions of information contained on both faces of respective document sheets in set S with maximized use of the full reproduction rate of the apparatus 10 are shown in FIGS. 4–10. In these figures, the exemplary document set S consists of a three-sheet, duplex document (six pages) with the information contained on a document sheet shown for convenience as a dot associated with a sheet face, the dots being respectively numbered to represent a page number. While the shown page numbering represents a preferred order (i.e., page sequential order, first page on top), other orders may be utilized (e.g. page sequential order, first page on the bottom).

Figure 4:
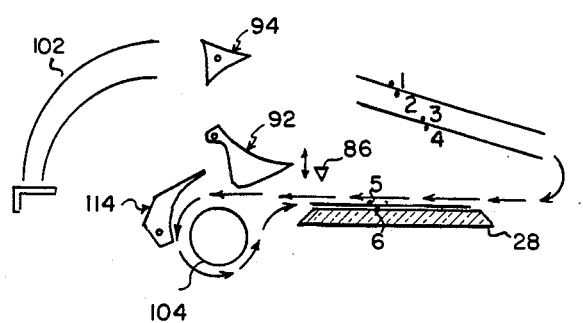
FIGS. 4-6 are diagramatic illustrations of the operation of the document feeder of FIG. 2 for transporting duplex sheets, showing the first document set circulation.
Figure 5:
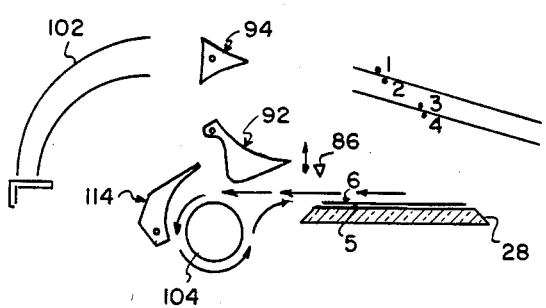
Figure 6:
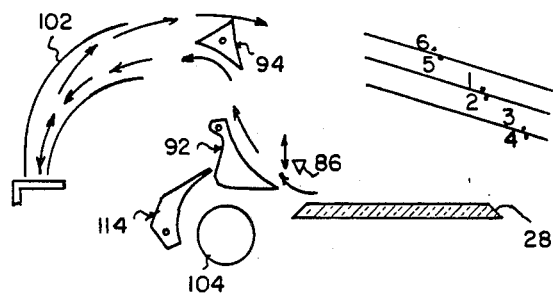

The first circulation for each of the document sheets in the set S is shown sequentially in FIGS. 4–6. The bottom-most document sheet is removed from hopper 64 by feeder 72 and advanced across platen 28 by transport mechanism 74 with belt 76 moving about its closed loop path in a clockwise direction. Diverters 92 and 114 are positioned to direct such sheet to roller 104. The roller advances such sheet back toward the platen. The drive for transport mechanism 74 is reversed to move the belt 76 in a counter-clockwise direction and advance such sheet fully over the platen. As shown in FIG. 4, page 6 is directed toward the platen 28 and is exposed to make a reproduction thereof. Thereafter, such sheet is transported in a like manner by transport mechanism 74 and roller 104 away from, and back to, the platen 28 (see FIG. 5). Page 5 then is directed toward the platen and exposed to make a reproduction thereof. Thereafter, diverters 92 and 94 are moved to their respective position shown in FIG. 6. Such document sheet is then advanced from platen 28 into turn-over device 102 and back to hopper 64 with page 6 on top. This procedure is repeated for the remaining document sheets in the set S so that reproductions of the pages are made in the proper sequential order (i.e. 6, 5, 4, 3, 2, 1) for collated stacking in output device 54 or hopper 56. After all the sheets have been circulated once, their order in the hopper 64 will be as follows: 2, 1, 4, 3, 6, 5.

Figure 7:
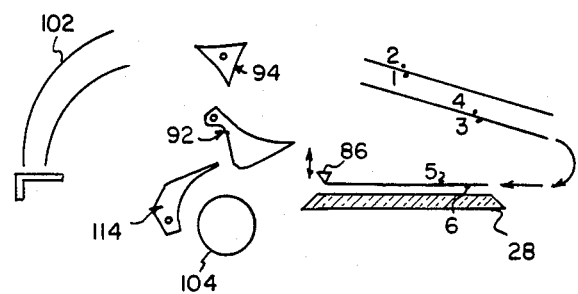
FIGS. 7-9 are diagramatic illustrations of the operation of the document feeder of FIG. 2 for transporting duplex document sheets showing an intermediate document set circulation.
Figure 8:
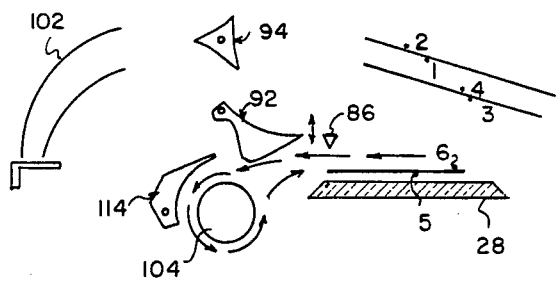
Figure 9:
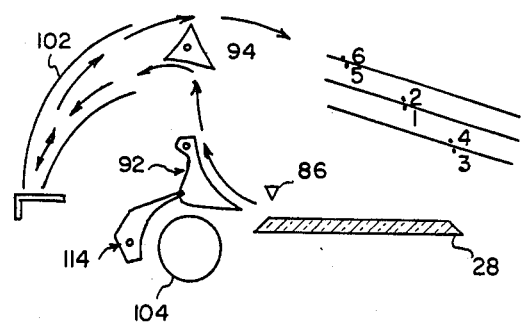
Figure 10:
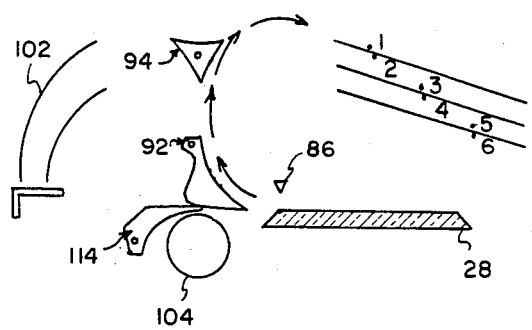
FIG. 10 is a diagrammatic illustration of the final step of operation of the document feeder of FIG. 2 for transporting duplex document sheets showing the last document set circulation.

FIGS. 7–9 show, subsequent document sheet circulation, except for the last circulation. As is apparent from FIG. 7, when the bottom-most document sheet is removed from hopper 64 and advanced to overlie the platen, page 6 is directed toward the platen. Such sheet may then be immediately exposed to make a reproduction thereof. Thereafter, such sheet is advanced from the platen, turned over, and returned to the platen in the manner described above with page 5 directed toward the platen (see FIG. 8). As shown in FIG. 9, after page 5 is exposed such sheet is advanced from the platen, turned over by device 102, and returned to hopper 64 in the same facial orientation as established after its first circulation (i.e. page 6 on top). This procedure is repeated for each document sheet until the desired number of reproductions thereof, less one, have been made.

The last circulation of the document sheets of the set S, and the reproduction of the pages thereof in the proper sequential order for collated stacking, occurs substantially the same as described above for the sheet circulations subsequent to the first circulation. However, after the first and second exposure of a document sheet are made as described with reference to FIGS. 7 and 8, such sheet is returned directly to hopper 64. That is to say, diverters 92 and 94 are positioned so that the returning document sheet by-passes turn-over device 102 (see FIG. 10). As a result, when such sheet is returned to hopper 64, it is in its initial facial orientation (i.e. page 5 on top). Thus when the copy procedure is completed for each document sheet, the document sheet set S is once again in its page sequential order, page 1 on top. The operator can then remove the document sheet set and does not have to reorient the individual sheets to place the sheets in their original order.

The document feeder operation described above has been summarized in the flow chart of FIG. 11. The document feeder shown in FIG. 2 is selected by placing a set of document sheets face up into the feeder hopper, at which time, the "SHEETS-FED" count of document sheets fed from the hopper, the "DELIVERED-SETS" count of copy sets delivered, and the "DELIVERED-COPY" count of copy sheets delivered are reset to zero. Also, the "SETS-DESIRED" count of copy sets wanted is entered via operator control panel P, and the "FRONTS-UP" flag is set (step 140).

When the "start" button is pressed (step 142), the document sheets are counted and the count stored (step 143). Then the feeder moves the bottom document sheet of the set from the hopper to platen 28 (step 144). The "SHEETS-FED" count is incremented (step 146) and both sides of the document sheet is copied (step 148). The "DELIVERED-COPY" count is incremented (step 150), and a determination is made as to whether the document sheet being copied is the last sheet of the set (step 152). If so, the document sheet is returned to the hopper in the same facial orientation as its initial facial orientation (step 154). If not, the document sheet is returned to the hopper in the opposite facial orientation as its initial facial orientation (step 156).

When the last document sheet of set S is copied, as determined (step 162) in a known manner by set-separator finger 71, a determination is made as to whether the last set of the job is in process (step 164). If not, the "BACKS-UP" flag is set (step 165) to indicate that the document sheets have been flipped. Otherwise, the "FRONTS-UP" flag is set. Each time the last sheet of the set is copied, the "DELIVERED-SETS" count of step 140 is incremented (step 166) and the "SHEETS-FED" count is reset to zero (step 168). If the desired number of copy sets have been made as determined at step 170, the "FRONTS-UP" flag is set and the "BACKS-UP" flag is cleared (step 172) and the job is complete. If not, the proper flag is set, and copying continues.

FEEDER JAM RECOVERY

As in conventional copiers, a jam in the document feeder is detected when various conditions occur, such as the document sheet fails to reach or pass various sensors along the sheet path. In this situation, the document sheet feeder is immediately stopped, and all copies in process are completed and cycled to either output device 54 or hopper 56, as appropriate. Normal machine shutdown occurs, and all job information is stored in memory.

By the present invention, two methods are available to the operator for recovering from a feeder jam when duplex documents are being copied. For purposes of description, and not as an indication of prior art, these methods are referred to herein as the "standard" method and the "enhanced" method.

Figure 12:
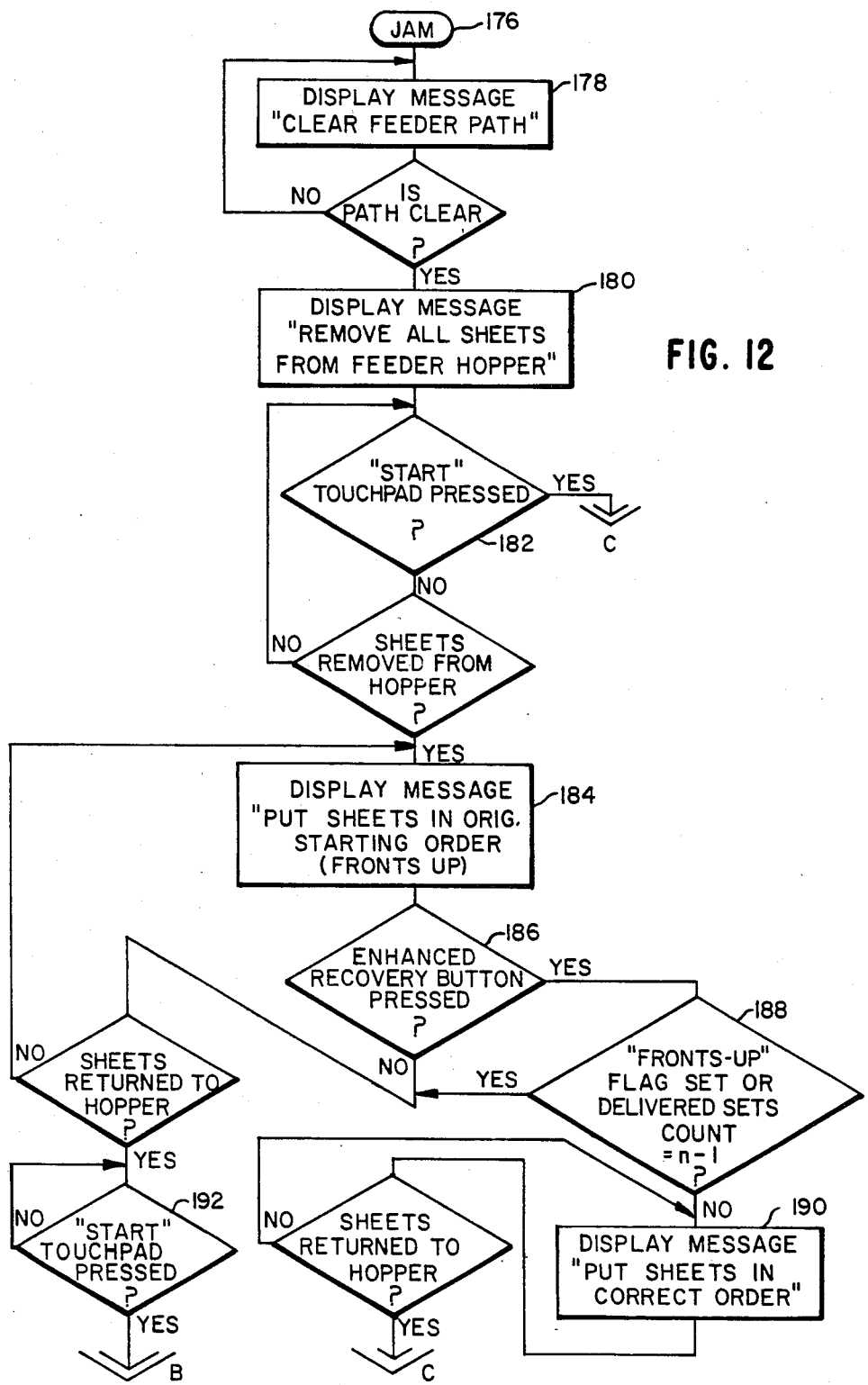
FIG. 12 is a flow chart showing the initial sequential operations of the document feeder of FIG. 2 during jam recovery operation.

Referring to FIG. 12, both methods commence with the occurrence of a feeder jam (step 176). LCU L (FIG. 1) displays a message on operator control panel P for the operator to clear the feeder path of document sheets (step 178). After the path has been cleared, the LCU causes a message to be displayed on the operator control panel instructing the operator to remove all document sheets from the feeder hopper (step 180).

The operator now has an opportunity to employ an "enhanced" recovery method or a "standard" method. If the operator wishes to employ the "enhanced" recovery method, to be explained in greater detail hereinafter, he or she ignores the message to remove the document sheets, and presses the "START" touchpad on panel P (step 182).

STANDARD JAM RECOVERY

On the otherhand, if the document sheets are removed from the hopper during the clearing operation, a message is displayed (step 184) on operator control panel P by the LCU, instructing the operator to put the document sheets back into the initial starting order and facial orientation. This is essentially a manual task of sorting and flipping sheets which is avoided by using the enhanced recovery method.

Even after the sheets have been removed, during all but the first and last set of the job, the operator may change his or her mind and still choose the enhanced method. In such case, the operator presses a special "ENHANCED RECOVERY" button on control panel P (step 186). When the "ENHANCED RECOVERY" button is pressed, the machine makes a determination that the first or last set is indeed not being run (step 188), and displays a message to return the sheets to the hopper without re-ordering them (step 190). The enhances recovery operation then takes over, as explained hereinafter.

If the "START" touchpad is pressed (step 192) without the "ENHANCED RECOVERY" button, the LCU assumes that standard recovery is desired, sets the "FRONTS UP" flag (step 194 in FIG. 13), feeds the document sheet from the bottom of the stack (step 196), and increments the sheets-fed count (step 198). At step 200, a determination is made, and, if the last set of the job is in process, the sheets are returned to the hopper with the facial orientation thereof being the same as their initial facial orientation (steps 202 or 204). If however other than the last set of the job is in process, the sheets are returned to the hopper with the facial orientation thereof being opposite to their initial facial orientation (steps 206 or 208).

The sheet feed is repeated until the last document sheet of the set returned to the hopper, as determined (step 210) in a known manner by set-separator finger 71. Now, a determination is made as to whether the last set of the job is in process (step 212). If not, the "BACKS-UP" flag is set (step 214) to indicate that the document sheets have been flipped. Otherwise, the "FRONTS-UP" flag is set and the "SHEETS-FED" count is reset to zero (step 216).

When as much of the document set as has already been copied has been returned to the hopper, as determined at step 218, copying is ready to resume (step 220).

ENHANCED JAM RECOVERY

Figure 14:
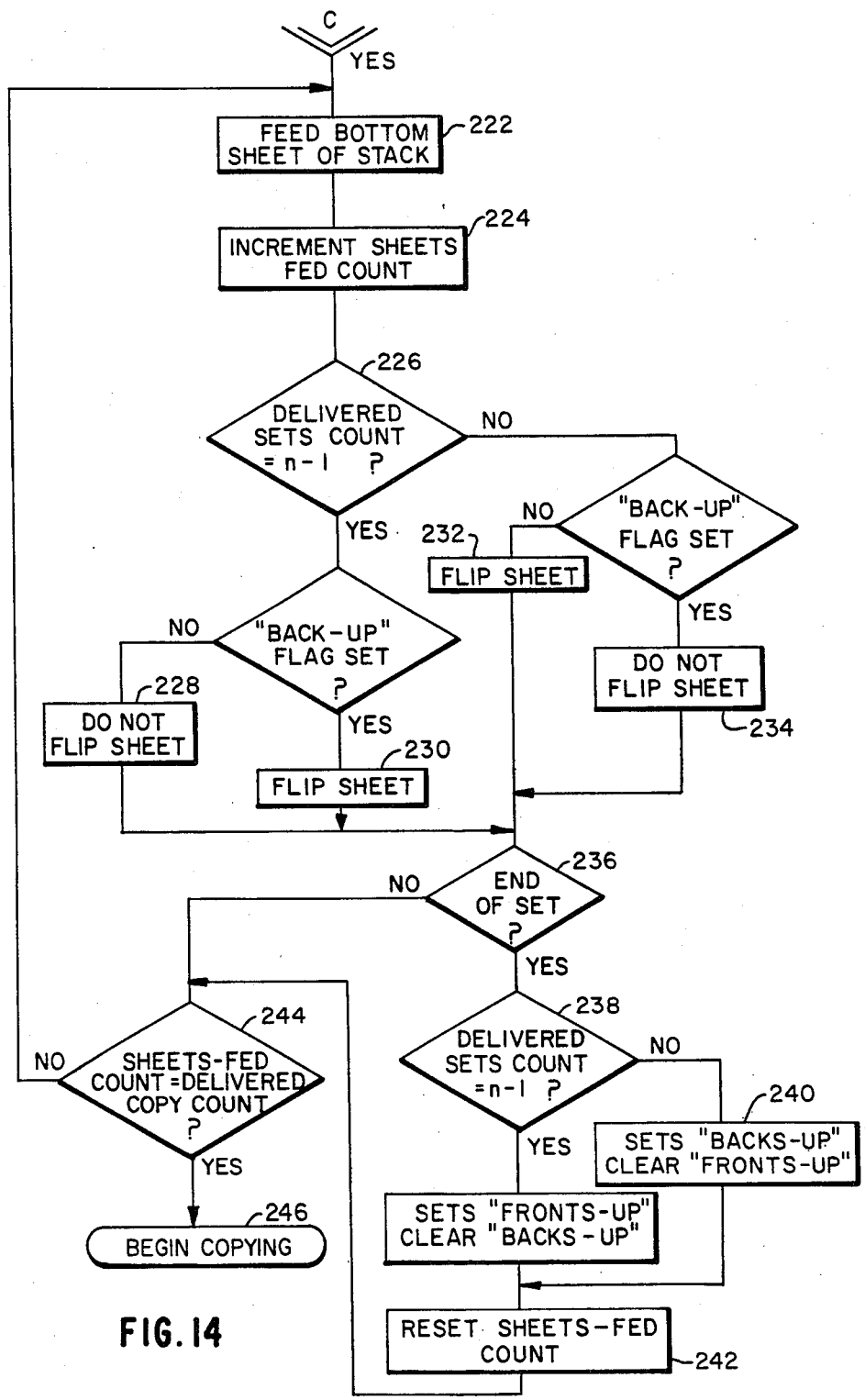
FIG. 14 is a flow chart continuation of FIG. 12 showing operations during enhanced jam recovery operations.

FIG. 14 continues the logic flow path of FIG. 12 for enhanced jam recovery. During the document sheet path clearing operation, document sheets are removed from the document sheet path and returned to the feeder hopper, starting with the furthest downstream sheet and progressing sequentially toward the hopper exit. When the sheets are returned to the hopper, they are facially oriented the same as the top sheet in the hopper.

Now the apparatus is prepared for enhanced recovery. The LCU feeds the document sheet from the bottom of the stack (step 222), and increments the sheets-fed count (step 224). At step 226, a determination is made, and, if the last set of the job is in process, the sheets are returned to the hopper with the facial orientation thereof being the same as their initial facial orientation (steps 228 or 230). If however other than the last set of the job is in process, the sheets are returned to the hopper with the facial orientation thereof being opposite to their initial facial orientation (steps 232 or 234).

The sheet feed is repeated until the last document sheet of the set returned to the hopper, as determined (step 236) in a known manner by set-separator finger 71. Now, a determination is made as to whether the last set of the job is in process (step 238). If not, the "BACKS-UP" flag is set (step 240) to indicate that the document sheets have been flipped. Otherwise, the "FRONTS-UP" flag is set and the "SHEETS-FED" count is reset to zero (step 242).

When as much of the document set as has already been copied has been returned to the hopper, as determined at step 244, copying is ready to resume (step 246).

The invention has been described in detail with particular reference to preferred embodiments thereof, but it will be understood that variations and modifications can be effected within the spirit and scope of the invention.

What is claimed is:

1. In a copier for producing copy sets of multi-sheet documents, jam recovery apparatus for rearranging document sheets in the hopper of a duplex recirculating document sheet feeder of the type which circulates document sheets seriatim from the bottom of a document set in the hopper, through the hopper's exit, along a document sheet path having a turn-over mechanism, and back to the hopper in a facial orientation opposite to their initial facial orientation; said apparatus comprising:

means, operative upon the occurrence of a jam and after the document sheets remaining in the document sheet path at the occurrence of the jam have been returned to the hopper, for feeding the document sheets seriatim from the bottom of the hopper, through the document sheet path, and back to the top of the hopper in the facial orientation opposite to their initial facial orientation; and means for thereupon feeding the document sheets seriatim from the bottom of the hopper, through the document sheet path, and back to the top of the hopper until as much of the document set as has already been copied in the current copy set at the time of the jam has been returned to the hopper, whereupon copying may be resumed.

2. In a copier for producing copy sets of multi-sheet documents, jam recovery apparatus for rearranging document sheets in the hopper of a duplex recirculating document sheet feeder of the type which circulates document sheets seriatim from the bottom of a document set in the hopper, through the hopper's exit, along a document sheet path having a turn-over mechanism, and back to the hopper in a facial orientation opposite to their initial facial orientation in all but the last job set; said apparatus comprising:

means, operative upon the occurrence of a jam and after the document sheets remaining in the document sheet path at the occurrence of the jam have been returned to the hopper, for feeding the document sheets seriatim from the bottom of the hopper, through the document sheet path, and back to the top of the hopper in their initial facial orientation if the last set of a job is in progress at the time of the jam, and otherwise in the facial orientation opposite to their initial facial orientation; and means for thereupon feeding the document sheets seriatim from the bottom of the hopper, through the document sheet path, and back to the top of the hopper until as much of the document set as has already been copied in the current copy set at the time of the jam has been returned to the hopper, whereupon copying may be resumed.

3. In a copier for producing copy sets of multi-sheet documents, a jam recovery process for rearranging document sheets in the hopper of a duplex recirculating document sheet feeder which produces a plurality of copy sets by circulating document sheets seriatim from the bottom of a document set in a hopper, through the hopper's exit, along a document sheet path having a turn-over mechanism, and back to the hopper in a facial orientation opposite to their initial facial orientation in all but the last job set, said recovery process comprising the steps of:

removing from the document sheet path those document sheets which remain in the document sheet path at the occurrence of a jam;

facially orienting the removed sheets the same as the top sheet in the hopper;

returning the removed and oriented sheets to the top of the set in the hopper in the sequential order starting first with the furthest downstream sheet along the document sheet path, and progressing sequentially upstream toward the hopper exit;

feeding the document sheets seriatim from the bottom of the hopper, through the document sheet path, and back to the top of the hopper in the facial orientation opposite to their initial facial orientation; and feeding the document sheets seriatim from the bottom of the hopper, through the document sheet path, and back to the top of the hopper until as much of the document set as has already been copied in the current copy set as been returned to the hopper, whereupon copying may be resumed.

4. In a copier for producing copy sets of multi-sheet documents, a jam recovery process for rearranging document sheets in the hopper of a duplex recirculating document sheet feeder which produces a plurality of copy sets by circulating document sheets seriatim from the bottom of a document set in a hopper, through the hopper's exit, along a document sheet path having a turn-over mechanism, and back to the hopper in a facial orientation opposite to their initial facial orientation in all but the last job set, said recovery process comprising the steps of:

removing from the document sheet path those document sheets which remain in the document sheet path at the occurrence of a jam;

facially orienting the removed sheets the same as the top sheet in the hopper;

returning the removed and oriented sheets to the top of the set in the hopper in the sequential order starting first with the furthest downstream sheet along the document sheet path, and progressing sequentially upstream toward the hopper exit;

feeding the document sheets seriatim from the bottom of the hopper, through the document sheet path, and back to the top of the hopper in their initial facial orientation if the last set of a job is in progress, and otherwise in the facial orientation opposite to their initial facial orientation; and feeding the document sheets seriatim from the bottom of the hopper, through the document sheet path, and back to the top of the hopper until as much of the document set as has already been copied in the current copy set has been returned to the hopper, whereupon copying may be resumed.

* * * * *